US011370279B2

(12) United States Patent
Allely et al.

(10) Patent No.: US 11,370,279 B2
(45) Date of Patent: Jun. 28, 2022

(54) ASSEMBLY OF AN ALUMINUM COMPONENT AND OF A STEEL COMPONENT HAVING A ZNALMG ALLOY COATING

(71) Applicant: ArcelorMittal, Luxembourg (LU)

(72) Inventors: Christian Allely, Maizieres-les-Metz (FR); Astrid Coffigny-Gregoire, Talange (FR); Laurence Dosdat, Rozerieulles (FR); Stéphane Morel, Metz (FR)

(73) Assignee: ARCELORMITTAL, Luxembourg (LU)

( * ) Notice: Subject to any disclaimer, the term of this patent is extended or adjusted under 35 U.S.C. 154(b) by 315 days.

(21) Appl. No.: 16/402,763

(22) Filed: May 3, 2019

(65) Prior Publication Data
US 2019/0255921 A1 Aug. 22, 2019

Related U.S. Application Data

(63) Continuation of application No. 14/413,965, filed as application No. PCT/IB2013/000929 on May 13, 2013, now abandoned.

(51) Int. Cl.
C23C 2/06 (2006.01)
C22C 18/04 (2006.01)
(Continued)

(52) U.S. Cl.
CPC ............ B60J 5/0483 (2013.01); B32B 37/12 (2013.01); B32B 37/18 (2013.01); C22C 18/04 (2013.01);
(Continued)

(58) Field of Classification Search
CPC .................................. C22C 18/04; C23C 2/06
See application file for complete search history.

(56) References Cited

U.S. PATENT DOCUMENTS 3,505,043 A 4/1970 Lee et al.
5,470,416 A * 11/1995 Herring, Jr. .......... B21D 39/021
137/268
(Continued)

FOREIGN PATENT DOCUMENTS

CN 101605859 A 12/2009
CN 102459683 A 5/2012
(Continued)

OTHER PUBLICATIONS

König F: "Kontaktkorrosion an Aluminium /Stahl—und Magnesium/ Stahl—Verbindungen," Galvanotechnik, Eugene G. Leuze Verlag, Salgau/Wurtt, DE. Vol. 89, No. 7, Jul. 1, 1998, pp. 2199-2209, XP002151143, ISSN: 0016-4232, see International Search Report of PCT/IB2013/000929, dated Apr. 2, 2014.
(Continued)

Primary Examiner — Adam Krupicka
(74) Attorney, Agent, or Firm — Davidson, Davidson & Kappel, LLC

(57) ABSTRACT

An Al-steel assembly is provided. The assembly includes an aluminum-based element and a steel element on at least one surface of the aluminum-based element. The steel element has a metal coating made of a zinc-aluminum-magnesium alloy and includes from 2.3% to 3.3% by weight of magnesium and from 3.6% to 3.9% by weight of aluminum. A coated surface of the steel element is in contact with the aluminum-based element in an assembly zone and a protective coating coats the assembly around and adjacent the assembly zone. A body-in-white, further assembly and method are also provided.

15 Claims, 2 Drawing Sheets

(51) Int. Cl.
*B60J 5/04* (2006.01)
*B32B 37/12* (2006.01)
*B32B 37/18* (2006.01)

(52) U.S. Cl.
CPC ............ *C23C 2/06* (2013.01); *B32B 2605/00* (2013.01); *Y10T 156/10* (2015.01); *Y10T 428/12736* (2015.01)

(56) References Cited

U.S. PATENT DOCUMENTS

| | | |
|---|---|---|
| 6,235,410 B1 | 5/2001 | Komatsu et al. |
| 8,785,000 B2 | 7/2014 | Maalman et al. |
| 9,034,135 B2 | 5/2015 | Schulenburg et al. |
| 9,181,614 B2 | 11/2015 | Diez et al. |
| 2009/0011269 A1 | 1/2009 | Urushihara et al. |
| 2010/0304183 A1 | 12/2010 | Honda et al. |

FOREIGN PATENT DOCUMENTS

| | | |
|---|---|---|
| EP | 1806200 A1 | 7/2007 |
| EP | 2141255 A1 | 1/2010 |
| KR | 1019990082512 A | 11/1999 |
| KR | 20030052200 A | 6/2003 |
| RU | 2384648 C2 | 3/2010 |
| RU | 2470088 C2 | 12/2012 |

OTHER PUBLICATIONS

International Search Report of PCT/IB2013/000929, dated Apr. 2, 2014.

\* cited by examiner

ASSEMBLY OF AN ALUMINUM COMPONENT AND OF A STEEL COMPONENT HAVING A ZNALMG ALLOY COATING

This is a Continuation of U.S. patent application Ser. No. 14/413,965, filed Jan. 9, 2015 which is a National Phase of International Patent Application PCT/IB2013/000929, filed Mary 13, 2013, all of which are hereby incorporated by reference herein.

The present invention relates to an assembly of an aluminum-based part and a part made of steel provided with a coating made of a zinc-aluminum-magnesium alloy, on at least one of the surfaces thereof placed so as to be in contact at least partially with the aluminum-based part.

These assemblies are for example intended for use in the manufacture of auto body parts, such as door openings and the like, without however being limited thereto.

BACKGROUND

The metal coatings essentially comprising zinc are traditionally used for their good protective properties against corrosion. The addition of magnesium to the coating markedly increases the corrosion resistance of these coatings, which then provides the ability to reduce their thickness or provide greater assurance of protection against corrosion over time. Furthermore, the addition of aluminum also makes it possible to improve the corrosion resistance.

The constant need to seek reduction in weight in order to reduce $CO_2$ emissions leads to the need to seek hybrid solutions combining in particular aluminum and zinc coated steel. However, such a combination generates complex and evolving phenomena of corrosion by galvanic coupling of the two materials.

The patent application EP 2 141 255 discloses assemblies wherein the process involves adding magnesium to the steel coating in a quantity which may in particular vary between 0.8% and 10% by weight. The addition of 0.8% to 3.5% of aluminum to this same coating may also be envisaged.

BRIEF SUMMARY

However, the corrosion resistance of these assemblies continues to remain far too low over time, and there therefore exists a need for improvement thereof.

The present invention provides an assembly of an aluminum-based element and an element made of steel provided on at least one of the surfaces thereof, with a metal coating made of a zinc-aluminum-magnesium alloy including from 2.3% to 3.3% by weight of magnesium, from 3.5% to 3.9% by weight of aluminum, the remainder of the metal coating being zinc, inevitable impurities and possibly one or more additional elements selected from among Si, Sb, Pb, Ti, Ca, Mn, Sn, La, Ce, Cr, Ni or Bi. The coated surface of the element made of steel is in at least partial contact with the aluminum-based element, wherein the contact may be brought about by a layer of adhesive or sealant whose thickness is less than 5 mm.

The assembly may also include the following features, alone or in combination:

the metal coating made of a zinc-aluminum-magnesium alloy includes from 2.3% to 3.3% by weight of magnesium, and from 3.6% to 3.9% by weight of aluminum, the remainder of the metal coating consisting of zinc, inevitable impurities and possibly one or more additional elements selected from among Si, Sb, Pb, Ti, Ca, Mn, Sn, La, Ce, Cr, Ni or Bi; and the aluminum-based element and the element made of steel are assembled by crimping.

The present invention also provides a part for a vehicle, a vehicle door and a vehicle. The part includes the assembly according to the present invention. The vehicle door includes the part, the aluminum-based element is the exterior part of the door and the element made of steel is the interior part of the said door. The vehicle includes the part or the vehicle door.

The present invention also provides use of a part made of steel provided on at least one of the surfaces thereof, with a metal coating made of a zinc-aluminum-magnesium alloy including from 2.3% to 3.3% by weight of magnesium, from 3.5% to 3.9% by weight of aluminum, the remainder of the metal coating being zinc, inevitable impurities and possibly one or more additional elements selected from among Si, Sb, Pb, Ti, Ca, Mn, Sn, La, Ce, Cr, Ni or Bi, for the manufacture of assemblies in accordance with the present invention.

BRIEF DESCRIPTION OF THE DRAWINGS

The invention will now be illustrated by means of indicative examples given for information purposes only, and without limitation, with reference made to the accompanying figures in which.

DETAILED DESCRIPTION

Figure 1:
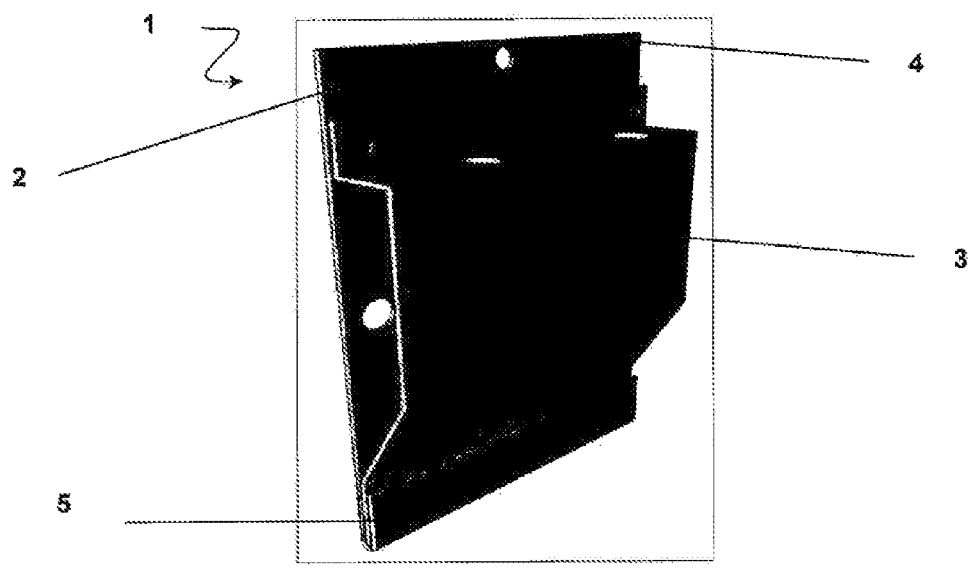
FIG. 1 schematically represents an assembly according to the invention.

The assembly 1 according to an embodiment of the present invention first of all comprises a first aluminum-based element, and which here takes the form of a panel 2. By that it is intended to cover pure aluminum and all of its alloys comprising at least 85% by weight of aluminum, including therein the 1000 to 7000 series which comprise aluminum without any alloying additive element and alloys of various compositions:

aluminum without alloying element: 1000
aluminum+copper: 2000
aluminum+manganese: 3000
aluminum+silicon: 4000
aluminum+magnesium: 5000
aluminum+magnesium+silicon: 6000
aluminum+zinc+magnesium: 7000

This panel 2 has suitable dimensions adapted to the subsequent use of the assembly according to the invention. In a preferred embodiment, the assembly 1 in question is integrated into a vehicle door, the aluminum-based panel being positioned on the exterior side of the vehicle.

The aluminum-based panel 2 may further include on at least one part of its surface one or more protective coatings such as phosphating and/or cataphoresis type coatings, such as those usually applied on the bodies-in-white for vehicles. The assembly with the second steel coated element 3 being generally performed prior to the passage of the body-inwhite in the baths containing coating types like phosphating and/or cataphoresis coatings, only the parts situated outside the assembly zone will thus be coated.

The second element of the assemblies according to the invention is thus an element 3 made of steel provided on at least one of the surfaces thereof, with a metal coating made of a zinc-aluminum-magnesium alloy including from 2.3% to 3.3% by weight of magnesium, from 3.5% to 3.9% by weight of aluminum, the remainder of the metal coating consisting of zinc, inevitable impurities and possibly one or more additional elements selected from among Si, Sb, Pb, Ti, Ca, Mn, Sn, La, Ce, Cr, Ni or Bi.

The content by weight of each additional element is generally less than 0.3%. The additional elements may, among other things, provide the ability to improve the ductility or adhesion of the coating on to the steel element. The person skilled in the art who knows their effects on the characteristics of the coating will know to use them according to the additional or complementary desired goal.

The coating may finally contain residual elements originating, for example, from the coating bath when use is made of a hot dip coating process. It may be contaminated with impurities derived from the feed ingots or resulting from the passage of the steel element in the coating bath. Among these mention may be made in particular of iron the content whereof may go up to 5% by weight and is generally between 2% and 4% by weight in the coating.

In a preferred embodiment, the coating comprises from 2.3% to 3.3% by weight of magnesium and from 3.6% to 3.9% by weight of aluminum.

In a preferred embodiment, the weight ratio between the magnesium and aluminum in the metal coating is strictly less than or equal to 1, preferably strictly less than 1, and more preferably strictly less than 0.9.

The metal coating generally has a thickness that is less than or equal to 30 μm (microns) or even 25 μm and greater than or equal to 3 μm or even 5 μm.

As previously mentioned above, the two elements 2, 3 are assembled in a manner such that the coated surface of the element 3 made of steel is in at least partial contact with the aluminum-based element 2. In a preferred embodiment, the assembly may be done in particular by a mechanical method such as crimping of the two elements in an assembly zone 5 located, in the example shown in FIG. 1, in the lower part of the door formed by the assembly 1.

Such crimping could consist of a simple folding of one of the elements around the other, as shown in FIG. 1 where the element 2 is arranged so as to envelope the element 3. It is of course possible to carry out any other type of mechanical assembly known to the person skilled in the art.

It is also possible to assemble the panels according to the invention by means of structural bonding making use of an adhesive or a structural sealant which enables an assembly such that the mechanical stresses to which one or the other of the elements 2, 3 are subjected get transferred to the other element 3, 2. The layers of adhesives and/or sealants being very thin (generally less than 5 mm, or even less than 1 mm and even less than 200 μm), it would be considered that such a bonded assembly amounts to putting in contact the two elements 2, 3 in the same way as a simple mechanical assembly.

It is quite obviously possible to combine structural bonding and mechanical assembly in order to enhance the robustness of the assembly.

With a view to highlighting the enhanced performance obtained through using the assemblies according to the invention, some actual examples of embodiments will be detailed in comparison with assemblies based on the prior art.

EXAMPLES

For all of the examples of embodiments detailed, assembly samples were created with the assembly of panels made of aluminum AA6061 and steel panels coated with aluminum-zinc-(magnesium) alloys of variable composition, the coatings having a uniform thickness of 7.5 μm.

These assemblies include a first coated steel panel, having a size of 10 cm in width by 20 cm in height, for example. The process involves assembly by bonding of an aluminum panel having a size of, for example, 10 cm in width by 4 cm in height and having a thickness of 1 mm. The aluminum panel is positioned at the center of the steel panel and the spacing between the two panels due to the presence of adhesive is, for example, 120 μm, which simulates an assembly such as that of a motor vehicle door. The active zone where the two unpainted sidings face each other has a dimension of, for example, 6 cm in width by 4 cm in height. A copper wire connects the two sidings in order to bring them into electrical contact and thus be able to simulate galvanic corrosion in the active zone.

The inactive zone of the two sidings is protected by a paint obtained by phosphating followed by cataphoresis. The phosphating is performed in three steps with the products from the company Chemetall, for example: (i) degreasing agent Gardoclean S 5176+additive H7352, (ii) refiner Gardolene ZL6, (iii) phosphating bath Gardobond R24TA. The cataphoresis was performed with products from the company PPG, for example: binding agent W772+additive P978; T=32° C.; t=150 s; U=200V; Cooking: T=180° C.; duration time=35 min; cataphoresis thickness: 20 μm Corrosion Test The test used is the VDA 233-102 test which provides for subjecting the samples to a series of treatment cycles, each cycle lasting for one week, with a succession of sub-cycles A, B and C of 24 hours each.

Cycle A: cycle with treatment for a period of three hours by placing in the presence of a salt spray mist at 35° C.;

Cycle B: cycle of 24 hours without treatment with a salt spray mist at a temperature varying between 25° C. and 50° C. and a relative humidity varying between 70% and 95%;

Cycle C: cycle without treatment with a salt spray mist, at a temperature varying between −15° C. and 50° C. and a relative humidity varying between 70% and 95% ring The saline solution used is an aqueous solution containing 1% by weight of sodium chloride.

Galvanic Coupling Test

In order to evaluate the galvanic current density generated by the assembly of the aluminum and the coated steel, it is necessary to electrically connect the aluminum panel in the zone coated by cataphoresis treatment and the lower zone of the coated steel panel, by interposing a zero resistance ammeter (Bio-Logic Potentiostat VMP3).

Laser Triangulation Test

In order to evaluate the degree of corrosion of the zones of the coated steel panel included amongst the assembly samples described previously, measurements are carried out to determine the depth of corrosion etching of the aluminum by laser triangulation over the entire surface of a sample, and then the maximum observed value in micrometers is extracted therefrom.

Tests

The assembly samples of aluminum panels and steel panels coated with zinc-aluminum-(magnesium) alloys of variable composition such as previously described above were made and then subjected to the VDA 233-102 test.

At the end of each cycle, a first sample was subjected to measurements of depth of corrosion etching of the aluminum element by a laser triangulation technique.

Figure 2:
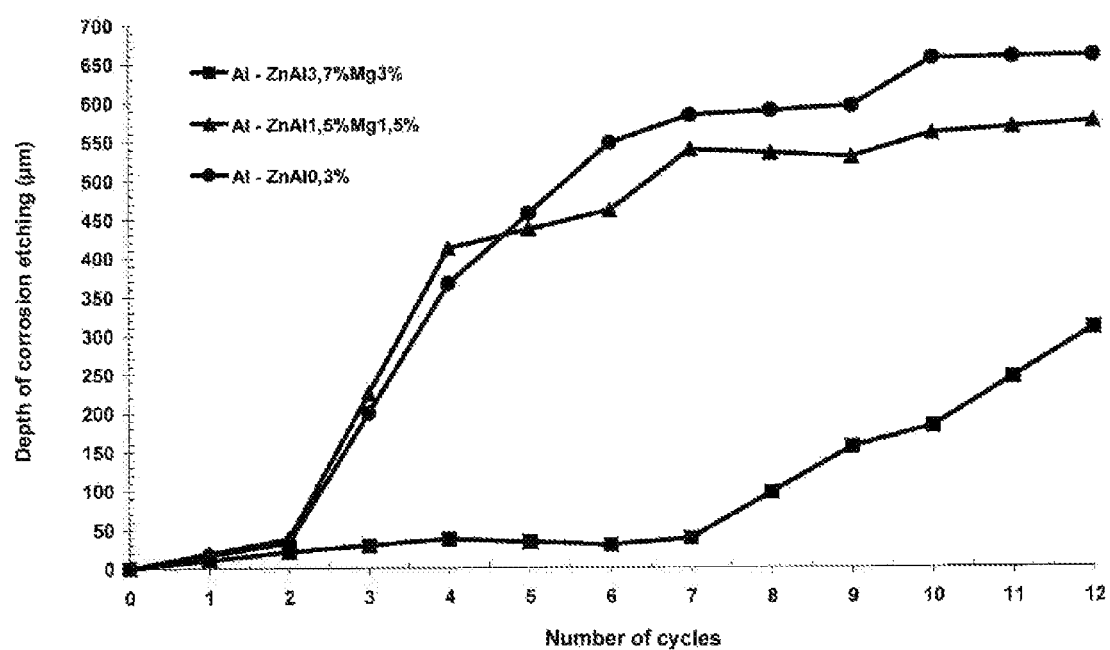
FIG. 2 represents the measurement curves depicting the evolution of the average depth of corrosion of the aluminum panels within the assemblies according to the invention in comparison to assemblies according to the prior art.

The results at 6 and 12 cycles are summarized and presented in Table 1 and the results detailed, cycle by cycle are presented in FIG. 2.

Figure 3:
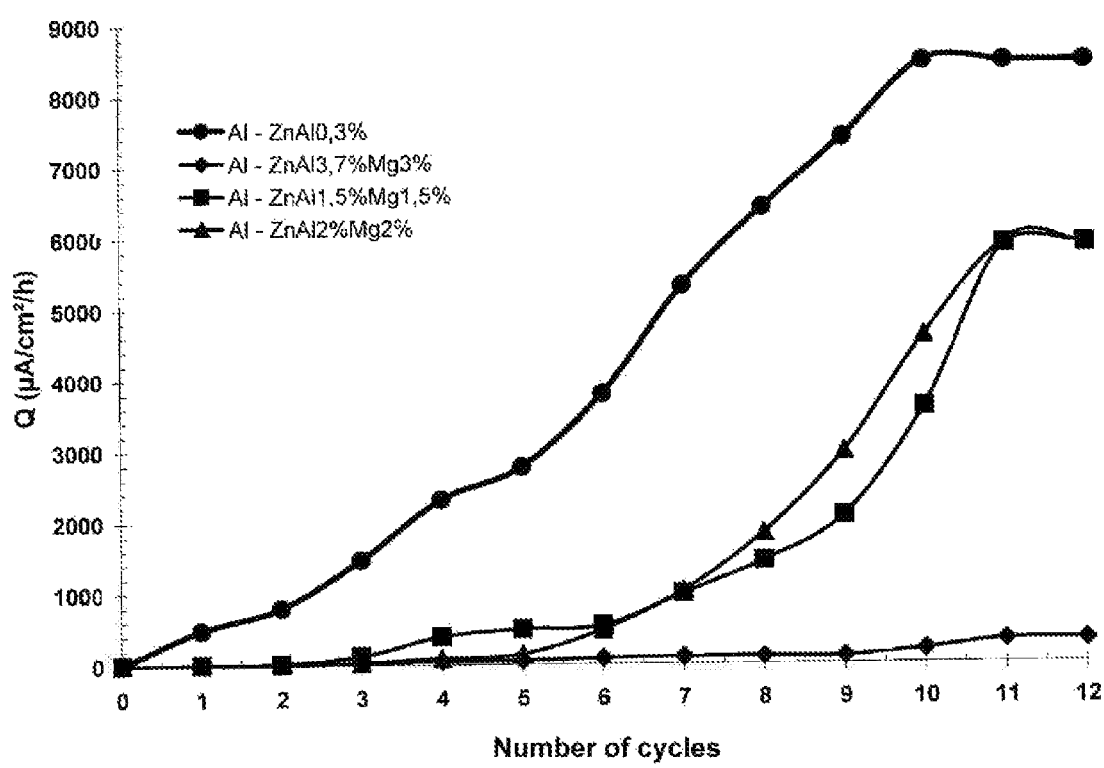
FIG. 3 represents the measurement curves depicting the evolution of the current density of galvanic coupling of assemblies according to the invention in comparison to assemblies based on the prior art.

A second sample was subsequently subjected to measurement of galvanic coupling potential. The results at 6 and 12 cycles are summarized and presented in Table 2 and the results detailed, cycle by cycle are presented in FIG. 3.

TABLE 1

Maximum depth of corrosion etching

| Sample | % Al by weight | % Mg by weight | P (μm) after 6 cycles | P (μm) after 12 cycles |
|---|---|---|---|---|
| 1 | 0.3 | 0 | 550 | 660 |
| 2 | 1.5 | 1.5 | 460 | 570 |
| 3 | 3.7 | 3.0 | 30 | 310 |

It is found that the sample 3 makes it possible to obtain significantly far better results than the Comparative Tests 1 and 2. Certainly some improvement in corrosion resistance is indeed observed between the sample 2 and the sample 1 after 12 cycles, however the improvement obtained in the sample 3 is of a significantly greater magnitude and altogether quite surprising. In addition, if one were to consider the results upon the completion of 6 cycles, there is clear indication of a difference in behavior that is extremely significant between the test according to the invention and the comparative tests, the maximum depth of corrosion etching of the aluminum element being divided by a factor of more than 15.

TABLE 2

Galvanic Coupling

| Sample | % Al by weight | % Mg by weight | Q (μA/cm$^2$/h) after 6 cycles | Q (μA/cm$^2$/h) after 12 cycles |
|---|---|---|---|---|
| 1 | 0.3 | 0 | 3 800 | 8 470 |
| 2 | 1.5 | 1.5 | 540 | 5 900 |
| 3 | 2.0 | 2.0 | 490 | 5 900 |
| 4 | 3.7 | 3.0 | 80 | 330 |

It is noted that the sample 4 makes it possible to obtain significantly far better results than the Comparative Tests 1 to 3. Certainly some improvement in corrosion resistance is indeed observed between the samples 2 and 3 and the sample 1, however the improvement obtained in the sample 4 is once again in this case, of a significantly greater magnitude and altogether quite surprising, especially since the sample 3, containing higher aluminum and magnesium content than sample 2, presents in the final analysis, performance levels that are identical to those of sample 2, which does not lead one to expect that an additional increase in aluminum and magnesium content would improve the performance levels, especially in these proportions.

What is claimed is:

1. An assembly comprising:
   an aluminum-based element; and
   a steel element on at least one surface of the aluminum-based element, the steel element having a metal coating made of a zinc-aluminum-magnesium alloy consisting of:
      from 2.3% to 3.3% by weight of magnesium; and
      from 3.6% to 3.9% by weight of aluminum; and
      a remainder being zinc, inevitable impurities and possibly one or more additional elements selected from among Si, Sb, Pb, Ti, Ca, Mn, Sn, La, Ce, Cr, Ni or Bi;
   a coated surface of the steel element being in contact with the aluminum-based element in an assembly zone; and
   a protective coating coating the assembly around and adjacent the assembly zone.

2. The assembly as recited in claim 1, wherein the protective coating coats at least one part of a surface of the aluminum-based element.

3. The assembly as recited in claim 1, wherein the protective coating includes a phosphating coating.

4. The assembly as recited in claim 1, wherein the protective coating includes a cataphoresis coating.

5. The assembly as recited in claim 1, wherein the protective coating includes a cataphoresis coating and a phosphating coating.

6. The assembly as recited in claim 1, wherein the assembly includes an adhesive bonding the aluminum-based element to the steel element.

7. The assembly as recited in claim 1, wherein an entirety of the assembly outside of the assembly zone has the protective coating.

8. A method for manufacturing the assembly as recited in claim 1, comprising:
   connecting the steel element to the aluminum-based element in the assembly zone; and, subsequently,
   passing the connected steel element and the aluminum-based element in a bath containing the protective coating.

9. An assembly comprising:
   an aluminum-based element having a first surface;
   a steel element provided on at least one surface of the aluminum-based element, the steel element having a metal coating made of a zinc-aluminum-magnesium alloy consisting of:
      from 2.3% to 3.3% by weight of magnesium, and
      from 3.6% to 3.9% by weight of aluminum, and
      a remainder of the metal coating being zinc, inevitable impurities and possibly one or more additional elements selected from among Si, Sb, Pb, Ti, Ca, Mn, Sn, La, Ce, Cr, Ni or Bi; and
   an adhesive bonding a coated surface of the steel element with the aluminum-based element in an active assembly zone, the aluminum-based element and the steel element being spaced from each other due to the adhesive.

10. The assembly as recited in claim 9, comprising a paint covering the assembly outside the active assembly zone.

11. The assembly as recited in claim 9, wherein the steel element is further crimped to the aluminum-based element.

12. The assembly as recited in claim 9, wherein a spacing between the aluminum-based element and the steel element is less than 5 mm.

13. The assembly as recited in claim 9, wherein a spacing between the aluminum-based element and the steel element is less than 1 mm.

14. The assembly as recited in claim 9 wherein a spacing between the aluminum-based element and the steel element is less than 200 microns.

15. The assembly as recited in claim 9, wherein a thickness of the metal coating is greater than or equal to 3 microns.

\* \* \* \* \*